United States Patent
Cordani

[19]

[11] Patent Number: 5,993,656
[45] Date of Patent: Nov. 30, 1999

[54] SELECTIVE FLUID ABSORBING DEVICE

[76] Inventor: Peter J. Cordani, 1374 N. Killian Dr., Lake Park, Fla. 33403

[21] Appl. No.: 09/046,170

[22] Filed: Mar. 23, 1998

[51] Int. Cl.⁶ ........................................... B01J 20/22
[52] U.S. Cl. .................. 210/282; 210/484; 210/502.1
[58] Field of Search ................... 210/242.4, 249, 210/282, 484, 500.28, 502.1, 232, 172, 241, DIG. 6

[56] References Cited

U.S. PATENT DOCUMENTS

| | | | |
|---|---|---|---|
| 3,348,686 | 10/1967 | Spitzer | 210/249 |
| 3,951,812 | 4/1976 | Hsu | 210/282 |
| 4,419,236 | 12/1983 | Hsu | 210/282 |
| 4,588,505 | 5/1986 | Walley et al. | 210/502.1 |
| 4,758,350 | 7/1988 | Pitts et al. | 210/282 |
| 4,861,469 | 8/1989 | Rossi et al. | 210/502.1 |
| 5,130,018 | 7/1992 | Tolman et al. | 210/282 |

Primary Examiner—David A. Simmons
Assistant Examiner—Frank M. Lawrence
Attorney, Agent, or Firm—McHale & Slavin

[57] ABSTRACT

A reusable fluid absorbing device for separating water from oil includes a water-permeable liner bag disposed within a rigid housing container. The rigid housing container includes at least one throughhole that fluidly couples the interior of the housing container to the exterior of the housing container. A removable end cap provides access to the housing compartment interior, allowing for removal and replacement of the liner bag. The liner bag is sealed shut and made from water-permeable material. A water-absorbing mixture of material is disposed within the water-permeable liner bag.

7 Claims, 1 Drawing Sheet

SELECTIVE FLUID ABSORBING DEVICE

FIELD OF THE INVENTION

This invention is directed to fluid-separating devices and in particular to a reusable device designed to passively separate water from oils.

BACKGROUND OF THE INVENTION

Many types of fluids are used in the operation of heavy machinery. Some fluids, like oils, provide lubrication between moving parts. Other fluids, like gasoline or diesel fuel, provide energy for combustion. Still other fluids are used in hydraulic devices to transfer forces from one point to another.

Impurities in machine-operating fluids may adversely affect the operation of the host machine. Depending upon the type of fluid and its intended use, various degrees of fluid purity are required. Impurities can take many forms and need not be solid. In many cases, impurities are simply collections of unwanted fluids. Depending on the type of machine and the location of the fluid, the presence of unwanted liquids can render a machine difficult to control or dangerous to operate.

Even the presence of unwanted water may disrupt the operation of some machines. For example, water mixed with hydraulic oil will produce unpredictable motion in hydraulic equipment. Because water and hydraulic oil each respond differently to pressure, the presence of water in hydraulic lines can alter the effective pressure transferred throughout a machine. As a result, the machine may become ineffective or difficult to control. Gasoline and diesel engines are also prone to difficulties from unwanted water. In fact, diesel engines typically require dedicated fuel separators to eliminate unwanted water from fuel reservoirs to reduce the risk of water-induced choking. Although gasoline engines are relatively more tolerant, water present in fuel lines may freeze in cold weather interfering with effective fuel flow. Excessive water may completely clog fuel line and starve an otherwise water-tolerant engine, preventing operation.

Several approaches have been developed to eliminate the hazards associated with impurities in machine-operating fluids. Some of methods address the presence of unwanted water, each has areas that may be improved.

One approach involves careful filtering of fluids during production and bottling. Although this method ensures that acceptable fluids are shipped to consumers, it does not control pollution that occurs after purchase and during use. In cool climates, for example, water vapor may collect inside fluid tanks and condense into liquid water, fouling the fluid supply.

Another approach involves the use of a dedicated fuel separator to actively filter water from fuel. Although fuel separators are effective in some applications, they have limited applicability. For example, fuel separators are typically not appropriate in hydraulic applications. Most hydraulic machines are, by nature, closed systems. As a result, the fluid flow needed for effective fuel separation is simply not present.

Still other approaches involve placement of fluid intake ports in locations that draw machine-operating fluids from above possible collections of relatively-heavier water. Devices that use this approach are shaped so that unwanted water collects in a low-level location away from fluid intake ducts. Unfortunately, this approach has limited use in hydraulic systems, where unwanted water can troublesome, regardless of location.

Thus, what is needed is a fluid absorption device that includes advantages of the known devices, while addressing the shortcomings they exhibit. The device should effectively separate water from oil without supervision or user input. The device should also be self-orienting to automatically face water and negatively buoyant to sink below oil during use. The device should operate passively, without reliance upon motors or external power sources. The device should also be easily retrieved after use and tolerant of temperature variations.

SUMMARY OF THE INVENTION

The instant invention is a water absorbing device designed to remove water from oils. The device includes a water-permeable liner bag disposed within a rigid housing container. The liner bag is sewn shut and includes a water-absorbing mixture of material. The housing container is perforated by throughholes that fluidly connect the interior and exterior of the housing container. A removable end cap provides access to the housing container interior, allowing liner bag removal and replacement. The device includes orientation means for ensuring that the throughholes remain properly positioned during use. A retrieval cord attached to the housing container allows easy recovery of the device after use.

Thus it is an object of the instant invention to provide a water absorbing device that separates water from oil.

It is also an object of the instant invention to provide a water absorbing device that is negatively buoyant to sink below oil during use.

It is a further object of the instant invention to provide a water absorbing device that is self-orienting to automatically face water deposits.

It is an additional object of the instant invention to provide a water absorbing device that may be retrieved easily after use.

It is still a further object of the instant invention to provide a water absorbing device that operates passively, requiring no external motor.

It is also an object of the instant invention to provide a water absorbing device that operates in environments that operates effectively in a wide range of temperatures.

It is still an additional object of the instant invention to provide a water absorbing device that operates without supervision or user input.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
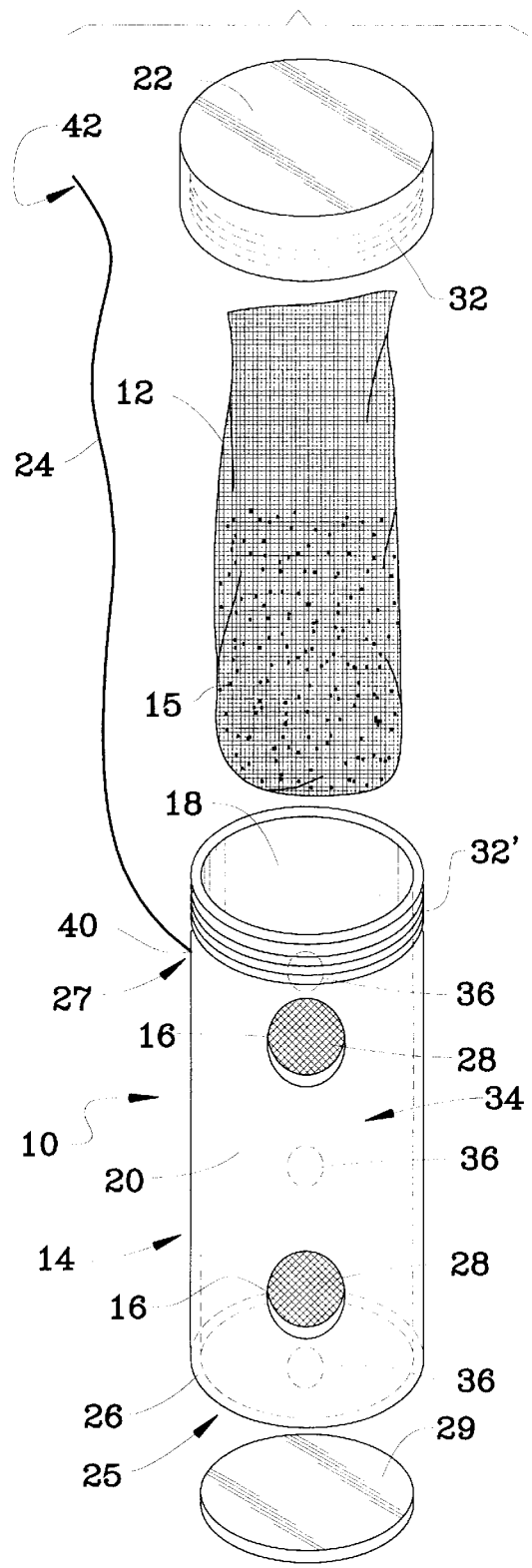
FIG. 1 is an exploded view of the water absorbing unit of the present invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with respect to FIG. 1, a pictorial view of the fluid absorption device 10 according to the present invention is shown. As will be discussed more fully below, the device 10 employs several components that work cooperatively to separate water from oil. The device 10 includes a water-permeable liner bag 12 disposed within a rigid housing container 14. The liner bag 12 contains absorbent material 15 that is sealed within the bag. The housing container 14 is perforated by throughholes 16 that fluidly connect the interior 18 of the housing container to the exterior 20 of the housing container. The housing container 14 also includes a removable end cap 22 that allows the liner bag 12 to be removed and replaced as needed. A retrieval cord 24 extends from the housing container 14 and allows recovery of the device 10 after use.

The housing container 14 is an essentially-hollow cylinder having a first end 25 spaced apart from a second end 27 by a continuous sidewall 26 extending therebetween. The first end 25 is permanently closed by a sealing panel 29, and the second end 27 is selectively closed by a threaded end cap 22. Threads 32 on the end cap 22 engage corresponding threads 32' on the housing container second end 27, allowing the second end to be opened and closed as needed. The interior 18 of the housing container is connected to the exterior 20 of the housing container by throughholes 16 that perforate the sidewall 26. In the preferred embodiment, the sidewall 26 contains two such throughholes 16 and each throughhole is covered by a retention screen 28.

With continued reference to FIG. 1, the liner bag 12 is a sealed pouch made from water-permeable material. In a preferred embodiment, the liner bag 12 is made from cheesecloth, polypropylene, or the like materials. The liner bag 12 contains an absorbent mixture of materials. More specifically, the liner bag 12 contains a mixture that is approximately 99.7% crosslinked polyacrylamide, and approximately 0.3% inert ingredients. This mixture absorbs water, but does not absorb oils. The material 15 inside the liner bag 12 expands as it absorbs water during use. Accordingly, the above-described the retention screens 28 are designed to keep the liner bag 12 inside the housing container 14. In this manner, the retention screens prevent rupture of the liner bag 12 due to overexpansion. However, the need for retention screens may be eliminated if the sidewall 26 is perforated by a series of sufficiently-small throughholes 16.

In preparation for use, the end cap 22 is removed. With the end cap 22 removed, the open second end 27 becomes an access port through which the liner bag 12 and included absorbent material 15 may be passed. The liner bag 12 and enclosed absorbent material 15 are inserted through the open second end 27 and placed within the interior 18 of the housing container 14. Once the bag and 12 and absorbent material 15 are inside the housing container 14, the end cap 22 is screwed back onto the second end 27. This threaded arrangement advantageously allows repeated removal and attachment of the cover panel 22. As a result, the liner bag 12 may be removed and replaced as needed. A disposable embodiment of this device 10 may be formed by permanently securing the cover panel 22 with adhesive.

Figure 2:
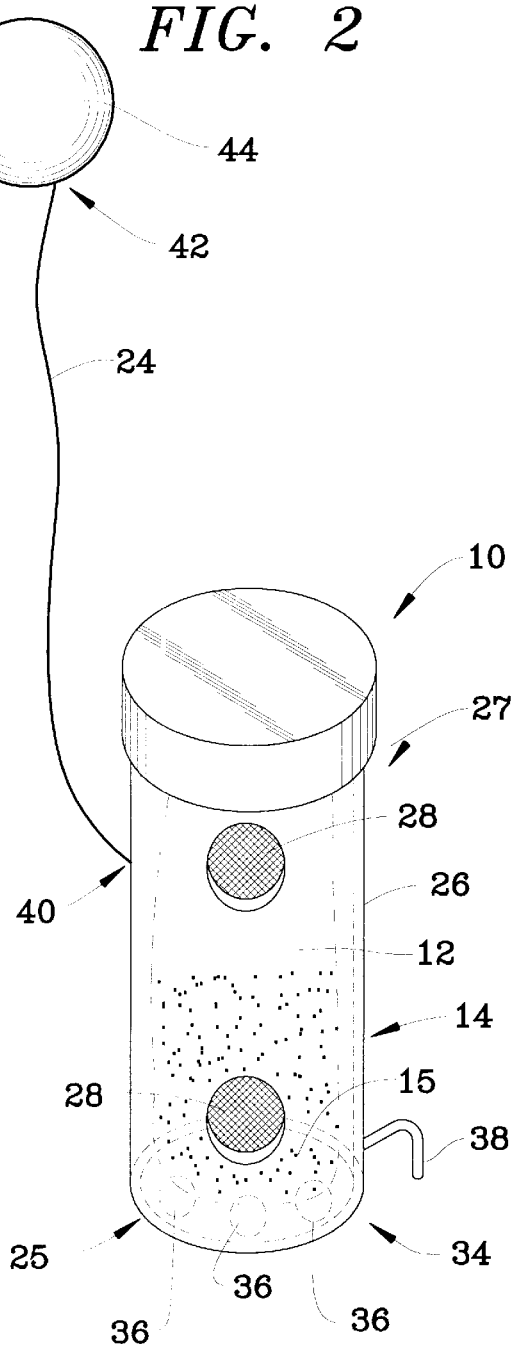
FIG. 2 is a pictorial view of an alternate embodiment of the water absorbing unit shown in FIG. 1.

The device 10 also includes an orientation means 34 for keeping the housing container 14 at a desired position. In a preferred embodiment, the orientation means 34 takes the form of weights 36 affixed to the housing container sidewall 26. In a preferred embodiment, the housing container 14 is formed from PVC material. While PVC is non-corrosive, it also tends to float. The inclusion of weights 36 ensures that the device 10 remains submerged during use. Since oils tend to float on top of water, the inclusion of weights 36 keeps the device 10 positioned as needed to absorb unwanted water. As shown in FIG. 2, the weights may also be placed inside the liner bag. With further reference to FIG. 2, the orientation means 34 may also include a mounting bracket 38 that extends from the housing container exterior 20. The mounting bracket 38 is shaped to engage a holding clip, not shown, selectively located in the environment which is to be serviced by the device 10.

The device 10 also includes a flexible retrieval cord 24 that allows the device to be recovered after use. The retrieval cord 24 is attached to the housing container 14 and does not interfere with the operation of the device 10. A first end 40 of the retrieval cord 24 is attached to the housing container sidewall 26, and a second end 42 of the retrieval cord is secured to a remote, user-accessible location. As shown in FIG. 2, the retrieval cord second end 42 may be fitted with a float 44.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A reusable fluid absorption device for removing water deposits from oil, said device comprising:

a water-permeable liner bag;

a predetermined amount of crosslinked polyacrylamide disposed within said liner bag;

a housing container formed by a substantially-solid continuous sidewall, said container having an interior, an exterior, and at least one throughhole extending through said sidewall and fluidly connecting said interior with said exterior, said interior sized to enclose said liner bag and an orientation means for self-orienting the device to automatically face water deposits;

whereby as said orientation means maintains said at least one throughhole in said orientation with respect to said water deposits, said throughholes are thereby preferentially directed away from said oil.

2. The reusable fluid absorption device of claim 1, further including:

a retention screen disposed across said at least one throughhole.

3. The reusable fluid absorption device of claim 1, wherein:

said housing container includes at least one access port sized and positioned to allow liner bag removal and replacement.

4. The reusable fluid absorption device of claim 3, further including:

a removable cover disposed over said access port.

5. The reusable fluid absorption device of claim 1, wherein:

said orientation means includes weights disposed within said housing container, said weights being substantially aligned with said at least one throughhole.

6. The reusable fluid absorption device of claim 1, further including:

a retrieval cord selectively attached to said housing container.

7. The reusable fluid absorption device of claim 3, further including:

a retrieval cord selectively attached to said housing container.

* * * * *